UNITED STATES PATENT OFFICE.

WILLIAM N. GARTSIDE, OF RICHMOND, INDIANA.

CORE MATERIAL.

SPECIFICATION forming part of Letters Patent No. 342,906, dated June 1, 1886.

Application filed August 12, 1885. Serial No. 174,230. (No specimens.)

*To all whom it may concern:*

Be it known that I, WILLIAM N. GARTSIDE, a citizen of the United States of America, residing at Richmond, in the county of Wayne, in the State of Indiana, have made a new and useful invention in Metal-Founding, of which the following is a specification.

My invention has relation to metal-founding, and especially relates to improvements in hollow or pipe cores used in casting metal forms.

The objects of my invention are, first, to provide a core which gives ample means for the gases to escape without injury to the mold or fracture to the core; second, to provide a hollow core which can be set in the mold without the use of prints on the pattern; and, third, to construct cores having the characteristics of durability, cheapness in material, and which may be readily molded to definite shapes.

In making castings of molten metal it is desirable to have the cores as delicate or thin in their walls as possible, yet strong enough to withstand the pressure of the molten metal; and these essential constituents I attain by means of the material or materials used in the composition of the core.

My invention is especially applicable for cores in molds for making screw-holes which have to be tapped out.

My invention consists in a hollow core for metal-founding composed of pulverized mica and a cohering ingredient.

My invention further consists in a hollow core for metal-founding, composed of pulverized mica, pulverized asbestus, and a cohering ingredient.

My invention further consists in a core for metal-founding composed of pulverized asbestus, pulverized mica, and silicate of soda, as hereinafter set forth.

In order to make or form my improved hollow cores, I compound the selected ingredient or ingredients with a cohering or cementing ingredient and reduce them to a plastic condition, after which the cores may be formed by any of the well-known ways. I find that silicate of soda gives the best results as a cement, since in the induration of the core it mixes with or unites with the other ingredients, and adds to the indestructibility of the completed article; but any ingredient having the requisite cohering characteristics can be incorporated with the mica and asbestus, siliceous cements being preferable. The cores, after being formed, are put into a hot oven or kiln and subjected to a temperature sufficient to consume the combustible elements in the composition. The plastic material may be passed between heated rollers over a former and then completely dried, as hereinbefore stated.

The proportions of the ingredients entering into the compound should be varied to suit the character of the work to be done. In molds using the small and delicate core mica may be used as the principal ingredient, compounded with a cohering material, as stated. It makes an open porous core, well adapted for light work. If a stronger core is required, I mix asbestus with the mica in about equal proportions, and for extra strong cores the asbestus and silicate of soda, the walls of the core in these latter instances being provided with a multitude of perforations to permit the escape of the gases. For screw-threads, the cores are formed with threads to suit the purpose, the molds being tapped out by any suitable means.

What I claim as my invention, and desire to secure by Letters Patent, is—

1. A hollow core for metal-founding, composed of pulverized mica and a binder, substantially as described.

2. A hollow core for metal-founding, composed of pulverized mica and silicate of soda, substantially as described.

3. A hollow core for metal-founding, composed of pulverized mica, pulverized asbestus, and a binder prepared as hereinbefore stated, and substantially as described.

4. A hollow core for metal-founding, composed of pulverized mica, pulverized asbestus, and silicate of soda, substantially as described.

In testimony whereof I have hereunto signed my name in the presence of two attesting witnesses.

WILLIAM N. GARTSIDE.

Attest:
PETER SHELLENBACK,
R. C. BIBERSTEIN.